United States Patent Office 3,398,227
Patented Aug. 20, 1968

3,398,227
METHOD FOR PREPARATION OF WETTABLE SULFUR
Richard L. Every and Ralph Leroy Grimsley, Ponca City, Okla., assignors to Continental Oil Company, Ponca City, Okla., a corporation of Delaware
No Drawing. Filed Sept. 10, 1965, Ser. No. 486,514
5 Claims. (Cl. 424—162)

ABSTRACT OF THE DISCLOSURE

The reaction of $H_2S$ and $SO_2$ bubbled through phosphate slime produces a finely divided sulfur which does not compact on standing. A small amount of a low-molecular-weight alcohol is beneficial.

---

This invention relates to preparation of sulfur. In one aspect, this invention relates to a method for preparing a readily dispersible sulfur.

Sulfur is useful, generally as a sulfur emulsion, in such agriculture use as fungicides, pesticides, miticides and insecticides. Also, such emulsions are useful in pH control of the soil. Sulfur can also be used dry for those uses, but sulfur emulsions are preferred for ease of spreading and to provide for sticking power of the sulfur on the plant to be covered. The commercial sulfur presently available is not readily dispersible in water and requires vigorous agitation to disperse the sulfur. Also, after standing, especially overnight, the sulfur settles and compacts making redispersion especially difficult.

Still other uses of sulfur is in reclamation of salt-damaged land in some areas. At present gypsum or dry sulfur is disked into the salt-damaged land and then is water flooded. However, if the sulfur could first be dispersed in the water and water flooded, economies could be effected in eliminating the two-step process. With the present commercially available sulfur the sulfur settles more rapidly at the point of introduction of the flood. It would, therefore, be highly desirable to provide a sulfur which forms a more stable dispersion.

Commercial sulfur is obtained either by mining or by one of several mehods of manufacture from sulfur containing gases. Several methods have been proposed for preparing sulfur from hydrogen sulfide gases, sulfur dioxide gases or gases containing mercaptans. For example, Urban et al. in U.S. Patents 3,099,536 and 3,050,370 teach bubbling such gases through solvents containing not more than about 40% water. The sulfur is formed in crystalline form. If greater amounts of water are used, the sulfur has a flocculant or tacky state which makes separation difficult. Brenner et al. in U.S. Patent 2,884,-352 suggest forming colloidal sulfur by admixing powdered sulfur in polyalcohols and are able to obtain colloidal suspensions up to about 4%. However, in all of these prior known methods, either a large amount of expensive solvents such as alcohols are required to maintain the sulfur in suspension, or the sulfur compacts upon standing. It is known that $H_2S$ and $SO_2$ will react in a ratio to 2 moles of $H_2S$ to 1 mole of $SO_2$ to form $H_2O$+sulfur when bubbled through a suitable liquid.

It is also well known in the art to upgrade phosphate rock by working with large quantities of water. As much as one-third of the original phosphate mixture will remain with the water as a colloidal suspension. This suspension is referred to as phosphate slime and will contain solids or colloidal suspension in the range of about 2% to about 6%. Huge slime pits are utilized to dispose of this waste material.

It is an object of this invention to provide a method of producing sulfur;

It is another object of this invention to provide a readily wettable sulfur which will not compact on settling;

Still other objects, features, and advantages of this invention will be readily apparent to those skilled in the art.

These objects are obtained according to this invention by bubbling $H_2S$ and $SO_2$ containing gases through phosphate slime to form a sulfur emulsion.

According to one aspect, the resulting emulsion is neutralized, preferably with ammonium hydroxide, and then dewatered.

Generally the conditions for our process can be carried out over a wide range of temperatures and pressures. Since heating, cooling and compressing cost money, the reaction conditions will normally be carried out at the prevailing conditions of the reactant. If the source of gases containing $H_2S$ and $SO_2$ are hot, then the temperature of the reaction will be somewhat above ambient. Otherwise, ambient temperatures and pressures will suffice. The gas need be under only sufficient pressure to push it into the reaction vessel which can be an open vat. If the gases are mixed with other desirable gases, then the vat would be closed and the non-reacting gases recovered.

While the $H_2S$ and $SO_2$ react in a mole ratio of 2 moles $H_2S$ per mole of $SO_2$, it is not necessary that the gases be in this ratio; however, it is desirable since the excess of one of the gases would pass through the slime without change.

The slime is used as recovered from the phosphate upgrading as working and no particular steps are required to adjust the phosphate content. In general, the normal range of colloidal suspension in such slime is 2 to 5% solids, and such range has proven satisfactory.

Since phosphates are desirable as a fertilizer ingredient, the emulsion resulting from passing the gases through the slime can be used as is. However, the cost of shipping is generally quite high as compared to water; therefore the resulting emulsion is preferably neutralized with a base. Since both potassium and ammonia are desirable fertilizer ingredients, the hydroxide of these materials are particularly preferred for neutralization. The resulting mixture is dewatered by decantation, filtration or any other suitable means of separating solids from liquids and then dried either by natural drying by being exposed to the atmosphere or by artificial drying means such as any number of commercial available drying ovens.

Surprisingly, the sulfur prepared by the above-described method is readiy dispersible in water, even after settling it is easily redispersed in water and has no tendency to compact even after prolonged standing, e.g., a month or more. When examined under a microscope, the particles have a different crystalline appearance from any of the naturally mined or manufactured commercial sulfurs we have examined. While the commercial sulfur particles appear to be single crystals or solid mass, our particles appear to be an agglomeration of very small particles. The reason for this difference is not understood, nor are we willing to speculate at this time.

To illustrate the superiority of our wettable sulfur over a commercial wettable sulfur, the following run was made.

EXAMPLE

Gaseous $H_2S$ and $SO_2$ in a 2:1 ratio of $H_2S$ to $SO_2$ was bubbled through a commercial phosphate slime solution (5.4% solids) to produce a sulfur emulsion. The emulsion was then neutralized with ammonium hydroxide and subsequently dewatered. The residue was then allowed to age three days to be sure all the water had been removed.

The dried residue and a commercial wettable sulfur were each mixed with water and using a hand sprayer were sprayed on paper which had been previously sprayed with flat black paint. The samples were then observed through a 28× microscope and compared. On observation the particles of sulfur appeared to be of relatively the same size except the commercial sulfur was seen to be of a single solid whereas the sulfur from this run was a cluster of sulfur particles which on higher magnification indicated individual particles almost invisible under the 28× microscope.

The sulfur prepared by the method of this invention when brushed with the hand adhered to the paper, and only a minute quantity brushed off, whereas the commercial sulfur readily brushed off.

Individual samples of the two sulfurs were slurried in an equal amount of water. The sulfur of the invention remained in suspension for a much longer period of time than did the commercial sulfur and even after settling was readily redispersed whereas the commercial sulfur required vigorous agitation to put it all back in suspension.

After drying, the sulfur of this invention remained powder-like, whereas the commercial sulfur showed a definite tendency to cake. The dried sulfur of the invention again was readily resuspended, whereas the commercial sulfur again required vigorous agitation. The sulfur of this invention being an agglomeration of very small particle size had a larger effective surface area which would make it more effective as a fungicide at the same rate of application.

As has been previously mentioned, the sulfur of this invention would have the added advantage of a plant food due to the presence of the phosphate content.

Since the sulfur formed by the process of this invention settles very slowly, e.g., after 6 weeks only about 90% had settled in one test; and since it is desirable to remove the water, we have found that a small amount of a low molecular weight alcohol, preferably $C_1$ to $C_3$ alcohols since they are comparatively inexpensive and plentiful supply, added to the phosphate slime prior to sulfur formation, will cause the sulfur to settle out in a few hours. The amount of alcohol required is in the range of 1 to 3 weight percent based on the water. After settling the water can be decanted off and the sulfur dried. The sulfur of this invention when so treated is easily resuspended in water when desired.

Having thus described the invention, we claim:

1. A method for the preparation of a wettable sulfur suspension which comprises passing gaseous $H_2S$ and $SO_2$ through water-phosphate slime containing 2 to 6 weight percent solids, whereby sulfur is precipitated and said sulfur suspension is formed.

2. The method of claim 1 wherein the resulting sulfur suspension is neutralized with a base.

3. The method of claim 2 wherein said base is potassium hydroxide.

4. The method of claim 2 which said base is ammonium hydroxide.

5. The method of claim 2 wherein the resulting sulfur is recovered from the suspension by dewatering.

References Cited

UNITED STATES PATENTS

| | | | |
|---|---|---|---|
| 1,995,545 | 3/1935 | Leahy | 23—3 |
| 3,099,536 | 7/1963 | Urban | 23—3 |

ALBERT T. MEYERS, *Primary Examiner.*

S. FRIEDMAN, *Assistant Examiner.*